(12) United States Patent
Wylin

(10) Patent No.: US 6,830,535 B2
(45) Date of Patent: Dec. 14, 2004

(54) FLUID LOCK DOUBLE DISPLACEMENT ENGINE

(75) Inventor: James P Wylin, Waterford, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 134 days.

(21) Appl. No.: 10/241,102

(22) Filed: Sep. 11, 2002

(65) Prior Publication Data

US 2004/0045287 A1 Mar. 11, 2004

(51) Int. Cl.⁷ .............................................. B60K 41/02
(52) U.S. Cl. ............... 477/110; 123/198 F; 123/DIG. 8
(58) Field of Search ................................ 477/107, 110; 123/198 F, DIG. 8

(56) References Cited

U.S. PATENT DOCUMENTS

| | | | | |
|---|---|---|---|---|
| 1,080,625 | A | * 12/1913 | Diesel | 123/DIG. 8 X |
| 4,069,803 | A | * 1/1978 | Cataldo | 123/198 F |
| 4,367,704 | A | * 1/1983 | Maucher et al. | 123/198 F |
| 4,389,985 | A | * 6/1983 | Huber et al. | 123/198 F |
| 4,555,003 | A | * 11/1985 | Phillips | 123/198 F X |
| 4,951,467 | A | 8/1990 | Walsh et al. | |
| 5,092,293 | A | * 3/1992 | Kaniut | 123/198 F |
| 5,492,189 | A | 2/1996 | Kriegler et al. | |
| 6,273,227 | B1 | * 8/2001 | Ohkubo | 192/3.29 |
| 6,306,056 | B1 | * 10/2001 | Moore | 475/5 |
| 6,568,177 | B1 | * 5/2003 | Surnilla | 123/198 F X |
| 6,568,509 | B1 | * 5/2003 | Sugiura | 184/106 |

FOREIGN PATENT DOCUMENTS

| | | | | |
|---|---|---|---|---|
| DE | 3212790 | * 10/1983 | | 123/198 F |
| DE | 3442112 | * 5/1986 | | 123/198 F |

* cited by examiner

Primary Examiner—Ha Ho
(74) Attorney, Agent, or Firm—Ralph E. Smith

(57) ABSTRACT

A dual displacement engine is provided with first and second crankshaft portions which are fluidly coupled to one another, for example, by a torque converter in order to provide an engine that can be utilized with alternative configurations of engine cylinders. Specifically, a first crankshaft portion can be provided with, for example, four pistons as a primary crankshaft portion for driving the vehicle, while a second crankshaft portion can be selectively engaged via a fluid coupling to supplement the power provided by the primary crankshaft portion. Thus, the vehicle can be operated using the primary crankshaft portion for fuel efficient operation while the second crankshaft portion can be selectively engaged for meeting higher torque demand requirements as necessary.

8 Claims, 2 Drawing Sheets

FLUID LOCK DOUBLE DISPLACEMENT ENGINE

FIELD OF THE INVENTION

The present invention relates to an internal combustion engine for use in a vehicle powertrain, and more particularly, to a double displacement engine having first and second crank shaft portions selectively coupled to one another by a fluid lock such as a torque converter.

BACKGROUND AND SUMMARY OF THE INVENTION

Internal combustion engines have been used for many years for providing motive power for driving a vehicle. Most vehicles on the road today are provided with either a four, six, or eight cylinder engine which is selected based upon the typical torque demand requirements for the individual type vehicle being designed. For example, four cylinder engines are typically used for commuter vehicles which are compact and typically have low load requirements and limited performance expectations. Six cylinder and eight cylinder engines are typically employed in larger vehicles wherein larger load carrying capacity and higher performance are expected. Some of the existing vehicle designs have suffered from the deficiency that the internal combustion engine for the vehicle has to be designed with a larger capacity than is most often required for optimal fuel efficiency.

The dual displacement engine of the present invention overcomes these deficiencies by providing a powertrain system that includes a dual crank shaft system with one of the crank shaft systems being independently operable for providing driving torque to a transmission while the second crank shaft system can be utilized to supplement the driving torque of the first crank shaft system to meet higher torque demand requirements. Operation of the first and second crank shaft systems is provided such that during normal driving at constant speeds and typical driving loads, the first engine crankshaft system is utilized for providing driving torque to the wheels of the vehicle. During periods of operation where increased levels of torque are required, such as during acceleration, pulling a heavy load, or climbing a hill, a torque converter or other fluid coupling-type device can be engaged in order to provide a connection between the first and second crankshaft systems for starting up and thereby operating the second crankshaft system in conjunction with the first crankshaft system for meeting the higher torque demand requirements.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
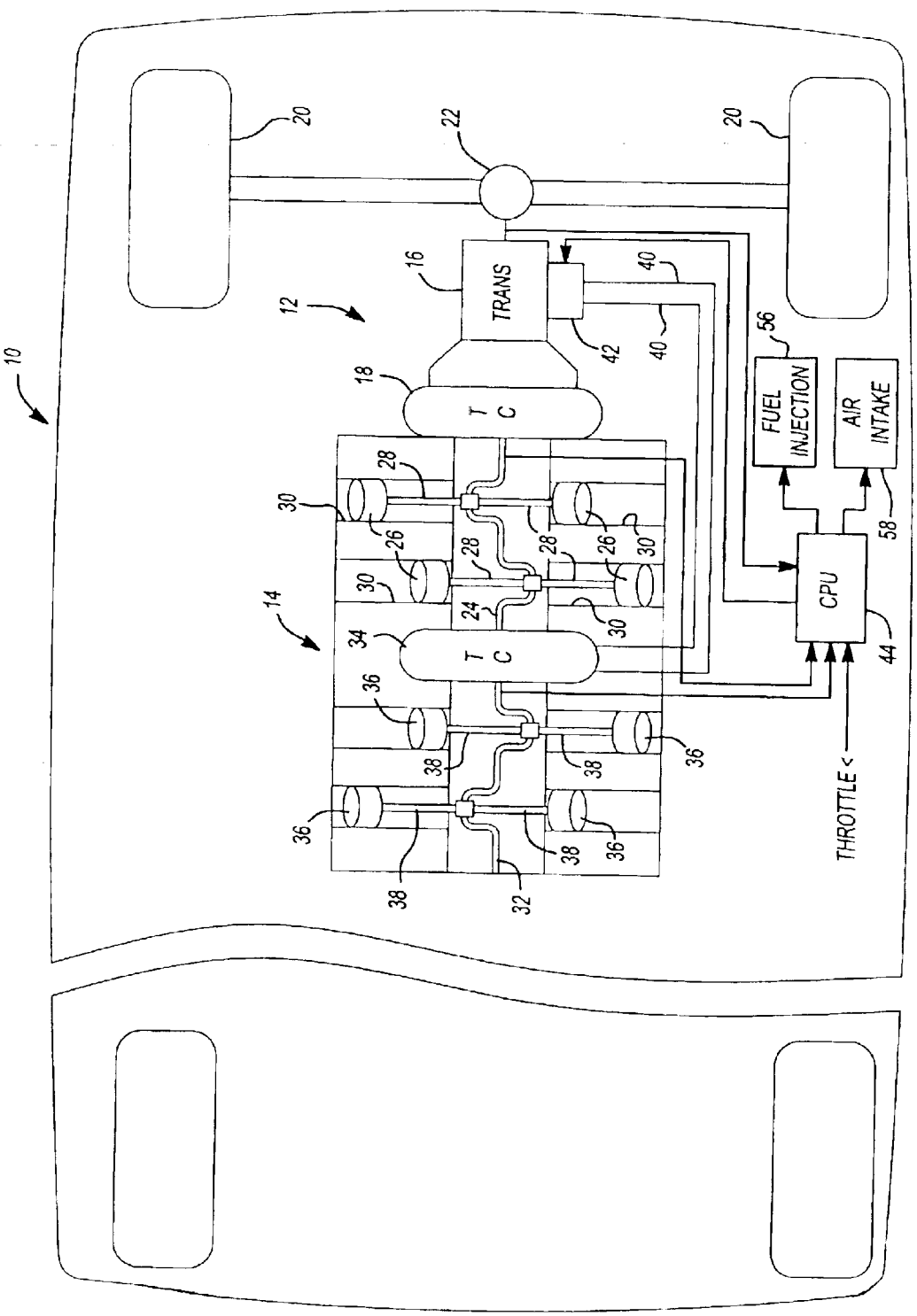
FIG. 1 is a schematic view of a vehicle powertrain system incorporating a fluid lock double displacement engine according to the principles of the present invention.

With reference to FIG. 1, a vehicle 10 is shown provided with a powertrain system 12 including a dual displacement engine 14 (which will be described in greater detail herein) connected to an automatic transmission 16 via a torque converter 18. A pair of drive wheels 20 are drivingly connected to the transmission 16 via a differential 22.

The dual displacement engine 14 includes a primary or first crankshaft portion 24 having a plurality of pistons 26 connected thereto by corresponding connecting rods 28. Each of the pistons 26 is disposed in a corresponding cylinder 30 as is well known in the engine art. For purposes of this illustration, four pistons 26 are mounted to the first crankshaft portion 24, although it should be understood that more or fewer pistons can be connected to the first crankshaft portion without departing from the spirit and scope of the present invention.

A second crankshaft portion 32, independently movable with respect to the first crankshaft portion 24 is provided and is selectively coupled to the first crankshaft portion 24 by a fluid coupling device such as a lock-up torque converter 34. (An exemplary torque converter of this type is shown in commonly assigned U.S. Pat. No. 4,951,467 which is herein incorporated by reference.) A plurality of pistons 36 are connected to the second crankshaft portion 32 by corresponding connecting rods 38.

The secondary torque converter 34 is supplied with pressurized transmission fluid via passages 40 which are connected to a valve body 42 of the automatic transmission 16. The valve body 42 of the automatic transmission 16 supplies hydraulic fluid to various components of the automatic transmission as is known in the art. Control of the valve body 42 is performed by a central processor unit 44 (also well known in the art) which monitors vehicle operating conditions and provides operational signals to the various electronic solenoids of the valve body 42 for activating and deactivating various clutch and brake units of the automatic transmission 16. The central processor unit 44 also provides an activation signal to a solenoid for engaging the torque converter 34 for drivingly connecting the second crankshaft portion 32 to the primary crankshaft portion 24 when the level of torque demand, as determined by the central processor unit 44, is such that the torque demand exceeds the available torque from the primary crankshaft portion 24 of the dual displacement engine 14. Thus, the dual displacement engine 14 can be operated for maximum fuel efficiency with a minimal number of cylinders in standard constant speed and/or low load driving while the secondary crankshaft portion 32 can become operational in order to provide additional torque when necessary, as determined by the central processing unit 44 (to provide additional torque upon demand). Thus, the dual displacement engine 14 of the present invention is capable of providing fuel efficient operation as, for example, a four cylinder engine during typical driving conditions while also providing the capability of meeting high torque demands for hauling heavy loads, climbing steep hills, or meeting rapid acceleration demands.

Figure 2:
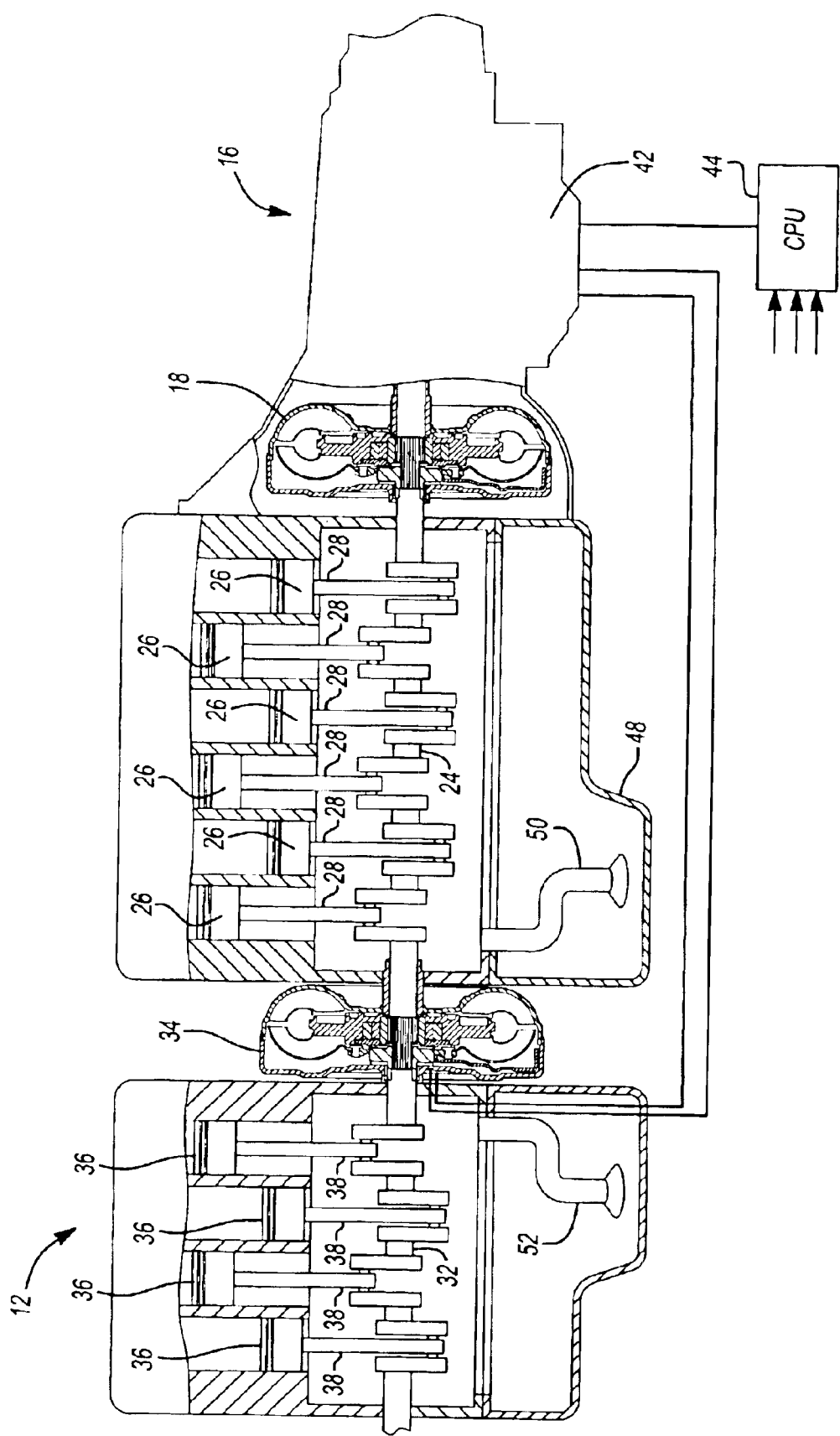
FIG. 2 is a schematic view further illustrating the implementation of a dual displacement engine according to the principles of the present invention.

The system of the present invention can utilize a common oil pan or separate oil pans 48 for providing lubricant to each of the crankshaft systems via separate oil intake passages 50, 52, as best shown in FIG. 2. In addition, the secondary torque converter 34 is able to connect to the existing valve body 42 of the automatic transmission 16 to supply operating fluid thereto. Each of the crankshafts can be supported within a common engine block which accommodates the torque converter between the primary and secondary crankshaft portions 24, 32. The central processing unit provides signals to the fuel injection 56 and air intake systems 58 for operating the first crankshaft portions and second crankshaft portion so as to co-rotate with one another.

The dual displacement engine of the present invention can be utilized with many configurations of engines including in-line cylinders and V-type cylinder arrangements with the number of cylinders varying based upon the intended use of the specific dual displacement engine. For example, dual four cylinder crankshaft systems can be utilized in order to provide a total of eight cylinders for high torque applications, or a four and two cylinder combination can be utilized for a total of six cylinders can be utilized for intermediate load type requirements. In addition, any other combinations of cylinder numbers may be utilized as is desired without departing from the spirit and scope of the present invention. It should also be noted that the secondary torque converter can also be provided with its own pump and transmission fluid supply separate from the transmission fluid supply of the automatic transmission. However, the preferred embodiment utilizes the existing pressurized fluid system of the automatic transmission in order to minimize the number of additional parts required. The dual displacement engine of the present invention can also utilize a common air intake manifold, exhaust manifold, and coolant system. In fact, use of a common coolant system allows the secondary crankshaft portion of the dual displacement engine 14 to be heated up by the engine coolant to an optimal engine operation temperature.

The dual displacement engine of the present invention utilizes a fluid coupling to allow for operation of an engine in alternative multiple cylinder configurations by combining two crankshaft portions via engagement of a torque converter to integrate a smooth fluid transition going from, for example, a four cylinder to an eight cylinder engine which is achieved electronically and hydraulically on an automatic control basis. The primary and secondary engines can be each provided with a starter motor for starting the primary and secondary engine portions, or the secondary engine portion can be started by application of the torque converter to transmit starting torque from the primary engine portion to the secondary engine portion.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A vehicle powertrain system, comprising:
   a first crankshaft portion having a first plurality of pistons drivingly connected thereto and each disposed in a respective cylinder;
   a second crankshaft portion having a second plurality of pistons drivingly connected thereto and each disposed in a respective cylinder; and
   a fluid coupling device operable to selectively interconnect said second crankshaft portion to said first crankshaft portion and;
   a controller for sensing a torque demand based upon vehicle conditions and activating said fluid coupling device when said torque demand exceeds predetermined levels for predetermined vehicle operating conditions.

2. The vehicle powertrain system according to claim 1, wherein said first and second crankshaft portions are coaxially aligned.

3. The vehicle powertrain system according to claim 1, wherein said first and second crankshaft portions are supplied with lubrication oil from a common oil pan.

4. The vehicle powertrain system according to claim 1, further comprising an automatic transmission connected to said first crankshaft portion by a torque converter, said automatic transmission including a valve body for providing hydraulic control of components of said automatic transmission, said valve body being operable to provide pressurized fluid to said fluid coupling device.

5. The vehicle powertrain system according to claim 1, wherein said first and second crankshaft portions are supported by a common engine block.

6. The vehicle powertrain system according to claim 1, wherein said first crankshaft portion includes at least four pistons drivingly connected thereto and said second crankshaft portion includes at least two pistons drivingly connected thereto.

7. The vehicle powertrain system according to claim 1, further comprising fuel and air delivery systems for introducing fuel and air to said cylinders, said controller providing control of said fuel and air delivery systems to synchronize the rotation of the first and second crankshaft portions.

8. The vehicle powertrain system according to claim 1, wherein said fluid coupling device is a lock-up torque converter.

* * * * *